United States Patent
McKenna et al.

(10) Patent No.: US 6,382,340 B1
(45) Date of Patent: May 7, 2002

(54) HYDRAULIC DRIVE SYSTEM AND CONTROLLER

(75) Inventors: Cathal McKenna, Emyvale; Eric O'Keeffe, Killeagh; Andrew William Wylie, Ballybay; Paul Patrick Quinn, Castleblayney; Gerard McHugh, Carrickmacross, all of (IE); Seamus Murchan, Warrenpoint (GB); Martin Damien McVicar, Emyvale; Gerard Harte, Castleblayney, both of (IE)

(73) Assignee: Moffett Research and Development Limited, Dundalk (IE)

( * ) Notice: Subject to any disclaimer, the term of this patent is extended or adjusted under 35 U.S.C. 154(b) by 0 days.

(21) Appl. No.: 09/200,710

(22) Filed: Nov. 27, 1998

(30) Foreign Application Priority Data

Nov. 26, 1997 (IE) ................................. S970832

(51) Int. Cl.⁷ ................................. B60K 8/00
(52) U.S. Cl. ................................. 180/308; 180/212
(58) Field of Search ................................. 180/245, 246, 180/305, 308, 212, 210; 60/421, 424, 427

(56) References Cited

U.S. PATENT DOCUMENTS

| 3,442,344 A | * | 5/1969 | Ocule | 60/424 |
|---|---|---|---|---|
| 4,261,431 A | * | 4/1981 | Hawbaker | 60/427 |
| 4,340,126 A | * | 7/1982 | Larson | 180/305 |
| 4,766,727 A | * | 8/1988 | Dull et al. | 60/427 |
| 5,199,525 A | * | 4/1993 | Schueler | 180/308 |
| 5,435,135 A | * | 7/1995 | Lallier et al. | 60/427 |
| 5,715,664 A | * | 2/1998 | Sallstrom et al. | 180/212 |

FOREIGN PATENT DOCUMENTS

| EP | 0816153 | | 1/1998 | |
|---|---|---|---|---|
| FR | 2719001 | | 10/1995 | |
| JP | 3-248921 | * | 11/1991 | 180/305 |
| SU | 1281450 | * | 1/1987 | 180/308 |

OTHER PUBLICATIONS

Poclain Hydraulics: GB Translation Ref. No. 93/2298/01, May 11, 1995, a translation of EP 0 547 947, Apr. 26, 1995.*

* cited by examiner

Primary Examiner—Frank Vanaman
(74) Attorney, Agent, or Firm—Jacobson Holman, PLLC

(57) ABSTRACT

A drive controller for a hydraulic drive system, a three wheeled vehicle having a pair of transversely arranged in line of drive shaft assemblies and a single wheel drive shaft assembly each assembly including a drive unit having two separate drives and has for series operation secondary hydraulic feed lines between one of the drives of the single drive units and one of the drives of each transverse drive unit. A pressure release valve is provided in each secondary line which valve is fed through a non-return valve.

14 Claims, 2 Drawing Sheets

HYDRAULIC DRIVE SYSTEM AND CONTROLLER

BACKGROUND OF THE INVENTION

1. Field of the Invention

The present invention relates to an hydraulic drive system and in particular to a hydraulic drive controller for use with the hydraulic drive system for three wheel vehicles of the general type first described and claimed in our co-pending European Patent Application No. 97650025. (Specification No. EP0816153).

2. Background Information

In this European Patent Specification No. EP0816153 there is claimed a hydraulics drive system for a vehicle, having three independent wheel drive shaft assemblies in an essentially triangular configuration, namely a transversely in-line pair of wheel drive shaft assemblies and a single wheel drive shaft assembly longitudinally spaced from the in-line pair and, in which the drive system comprises a hydraulic pump and a drive unit directly coupled to each of the drive shaft assemblies namely a single drive unit and a pair of transverse drive units and in which each drive unit comprises at least two separate drives directly coupled to each drive shaft assembly, each drive having a separate hydraulic input and output and in which valving is provided to feed hydraulic fluid to each drive unit whereby the drive units operate in series or in parallel.

This is a particularly satisfactory method of operating the hydraulic drive system in that in almost all situations it eliminates the difficulties of skidding, wheel spin and the like because when using a series arrangement all the time a simple and effective drive system is provided. This is particularly effective for three-wheeled vehicles and for three wheeled vehicles of a relatively short wheel base. A problem arises when it becomes necessary to turn the vehicle when the drives are operating in series by the simple expedients of converting to parallel operation.

Previous attempts have been made to overcome the problems of the operation of three-wheeled vehicles such as, for example, by the use of an hydraulic drive system as described in French Patent Specification No. 2719001 (E.C.B. SARL). This patent specification acknowledges the need for safety reasons to ensure that the wheels are all synchronised and that if the distributional load is, for example, equally distributed over the three wheels, the hydraulic transmission operates relatively well but that on slopes and, indeed, in difficult terrain it can become dangerous to operate the vehicle. Further, this patent specification discloses the problems with the prior art in the use of flow dividers, electronic distributors and the like. This patent specification proposes an arrangement somewhat similar to that described in European Patent Specification No. 0816153, however, unfortunately a very elaborate desynchronisation unit comprising an electro-distributor which allows the flow of oil between the drives. However, with the electro-distributor which shut and if any of the wheels are locked or stopped for any reason with another wheel turning, excessive oil pressure can build up.

Certain problems have arisen in connection with the operation of a vehicle of with an hydraulic drive system in accordance with the invention described and claimed in this European Patent Specification No. EP 0816153 in the sense that it must always be appreciated that situations will arise, particularly when working in difficult terrain, when one of the wheels for example is stopped or turning more slowly than the others. While this does not generally happen due to the arrangement there are always situations when it may. This has unfortunately caused certain problems in operation.

OBJECTS

The present invention is directed to overcoming these problems.

SUMMARY OF THE INVENTION

According to the invention there is provided an hydraulic drive system for a three wheeled vehicle, each wheel having a separate wheel drive shaft assembly, each comprising at least two separate drives directly coupled to each other and together forming an in-line pair of drive shaft assemblies and a single drive shaft assembly comprising:

an hydraulic pump;

an oil supply;

input feed piping connecting the hydraulic pump, oil supply and the drives; and an hydraulic drive controller comprising:

hydraulic feed lines for feeding each of the drive units from the pumps;

hydraulic feed lines for return of hydraulic fluid from each drive unit to the pumps;

a secondary feed line connecting one of the drives of the single drive unit and one of the drives of one of the transverse drive units;

a further secondary feed line connecting the other drive of the single drive unit and one of the drives of the other drive unit;

a bypass hydraulic line mounted across each of the transverse drive units;

a diverter valve mounted in each bypass hydraulic line for parallel and series operation; and a pressure release valve in each secondary feed line.

The advantage of this is that when, for example, one of the three wheels will not turn, in other words if it is jammed or stuck, the pressure in the secondary drive in the line may exceed maximum working pressure and this could cause serious problems in for example, a hose bursting. Many other operational conditions can cause the same problem.

Further the invention provides a drive controller in which the pressure relief valve directly feeds the oil supply sump.

In one embodiment of the invention the pump feeds oil through a non-return valve to each secondary hydraulic feed line. The advantage of this is that the non-return valve will prevent cavitation.

Further, the pressure relief and non-return valves are incorporated in the one assembly.

In another embodiment of the invention, there is a time delay between changing from series operation to parallel operation.

Preferably, the time delay is between 0.5 and 2.0 seconds. Most preferably, the time delay is approximately 1.0 seconds.

In a further embodiment of the invention, each diverter valve is a hydraulic fluid operated diverter valve activated by a control valve in a hydraulic feed line of the drive controller and connected via a flow reducing device to the hydraulic oil supply, the control valve being movable from a position delivering pressurised fluid to the valve to a position closing off the supply of pressurised fluid and permitting flow of the hydraulic fluid out of the diverter valve through the flow reducing device to the sump.

Preferably, the control valve is a solenoid operated spool valve.

Most preferably, the diverter valve is a piston valve.

In another embodiment of the invention, the valves are housed in the one manifold block.

BRIEF DESCRIPTION OF THE DRAWINGS

Other features and advantages of the invention will be apparent from the following description taken in connection with the accompanying drawings, wherein.

DESCRIPTION OF THE PREFERRED EMBODIMENTS

Figure 1:
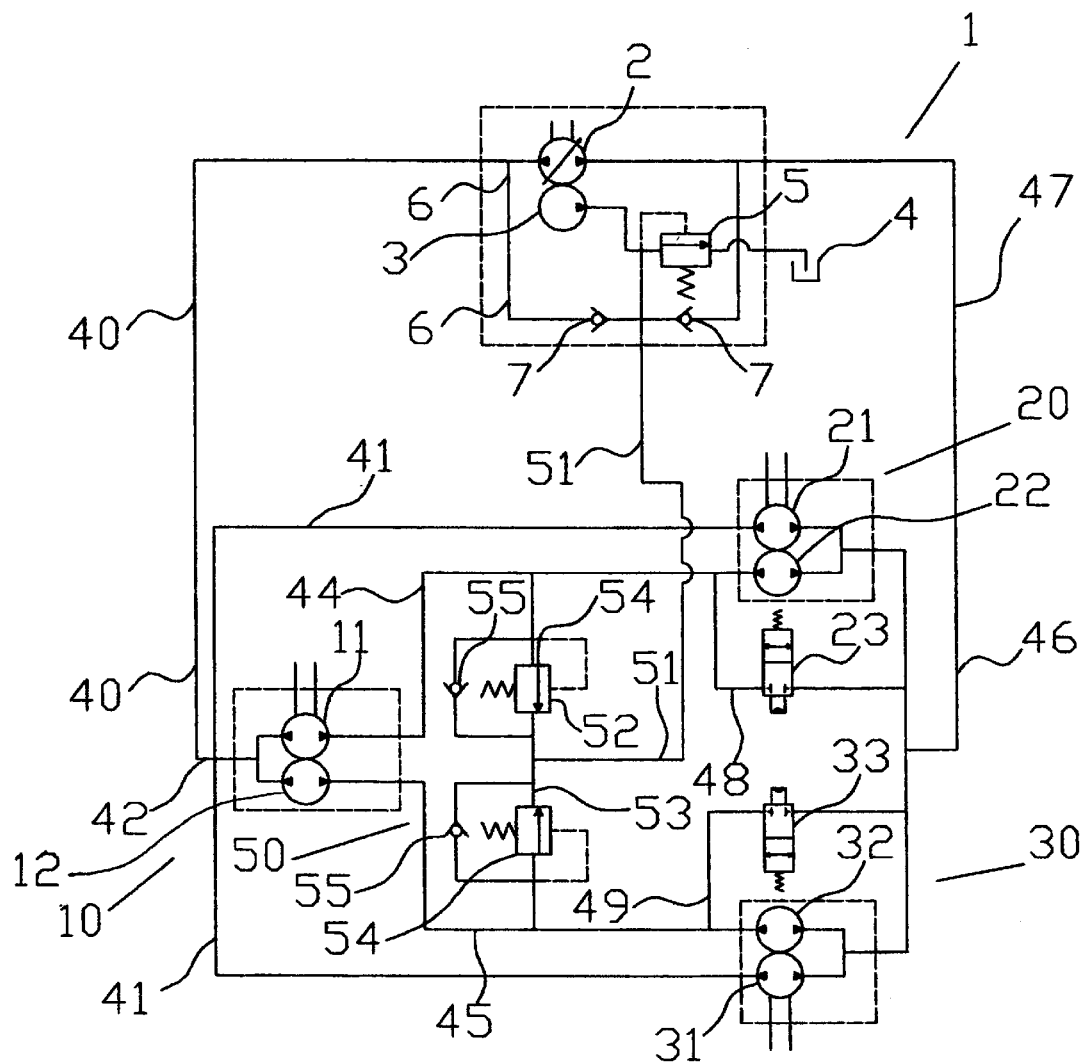
FIG. 1 is a diagrammatic representation of a hydraulic drive system according to the invention.

Referring to the drawings, there is illustrated a hydraulic drive system, indicated generally by the reference numeral 1 comprising a hydraulic pump 2, a single drive unit indicated generally by the reference numeral 10 and a pair of transverse drive units 20 and 30 respectively. Each of the drive units 10, 20 and 30 is individually coupled directly to a shaft forming a drive shaft assembly. For a forklift truck of the "piggy back" type, the drive units 10, 20 and 30 each comprise two separate mechanically linked drives 11 and 12; 21 and 22; and 31 and 32 respectively. The hydraulic pump 2 has associated therewith in conventional manner a booster pump 3 and associated dump oil sump 4 fed through a charge relief valve 5. The booster pump 3 is connected by a by-pass hydraulic fluid line 6 to a pair of conventional anti-cavitation non-return valves 7.

The hydraulic drive controller is identified generally by the reference numeral 50 and comprises a hydraulic line 51 connected to hydraulic lines 52 and 53 respectively directly connected to the secondary fluid lines 44 and 45. Mounted in each line 52 and 53 is, in parallel, a pressure release valve 54 and a non-return valve 55. The hydraulic line 51 is connected directly to the by-pass hydraulic fluid line 6.

The hydraulic pump 2 feeds the drives 11 and 12 through primary hydraulic fluid lines 40 and 42 as well as the drives 21 and 31 through primary hydraulic fluid lines 41. The output of the drive 11 is fed directly by the secondary fluid line 44 to the drive 22 of the transverse drive unit 20 and the output of the drive 12 is fed directly through the secondary fluid line 45 to the drive 32 of the transverse drive unit 30. Outputs of each of the drives 21, 22, 31 and 32 are fed through return hydraulic fluid lines 46 and 47 back to the input of the pump 2. Diverter valves 23 and 33 are mounted in by-pass hydraulic lines 48 and 49 between the secondary fluid lines 44 and 45 respectively and the return hydraulic fluid lines 46 and 47.

Before the various pipes and connections are described in more detail, the significance of the terms "input" and "output" has to be appreciated. As used in this specfication, they are interchangeable in that what is the input when the vehicle is travelling forward becomes the output when the vehicle is travelling in reverse. Thus, the term input and output is used for one direction of flow of the pump which is presumed to drive the vehicle to which the hydraulic drive system is attached forward and thus the term input is used in this context. Further, none of the pipes or line connections have been described in detail and standard connectors, valves etc. are ignored but will now be described below, the minimum number of reference numerals being used for clarity.

Similarly, the term "3 wheeled" covers not just three separate wheels in triangular configuration but any number of individual wheels forming three sets of wheels. Feed or return piping or conduit for hydraulic fluid which is more usually but not exclusively the actuation fluid is usually referred to simply as "hydraulic feed" or "feed" or "feed lines".

In operation with the diverter valves 23 and 33 shut, the drives 11 and 12 are in series with the drives 22 and 32 respectively and thus the whole three drive units 10, 20 and 30 operate in series. Accordingly, in the drive assemblies, wheel spin is prevented or more strictly potential wheel spin is nullified.

When the diverter valves 23 and 33 are opened, hydraulic fluid by-passes the drives 22 and 32 respectively and thus the hydraulic drive system operates in parallel, as the drives 21 and 31 as well as the drives 11 and 12 are all fed directly from the hydraulic pump 2 and return directly to it. This is particularly suitable for off site or when the terrain is not difficult.

In operation, if there is excess pressure in either of the secondary fluid lines 44 and 45, hydraulic fluid will be delivered through a pressure relief valve 54, into the lines 52 or 53, 51 and 6 through the charge release valve 5 to the dump oil sump 4. Similarly, if cavitation is likely to occur, the non-return valves 55 ensure that oil will be delivered from the booster pump 3 in the reverse direction.

Figure 2:
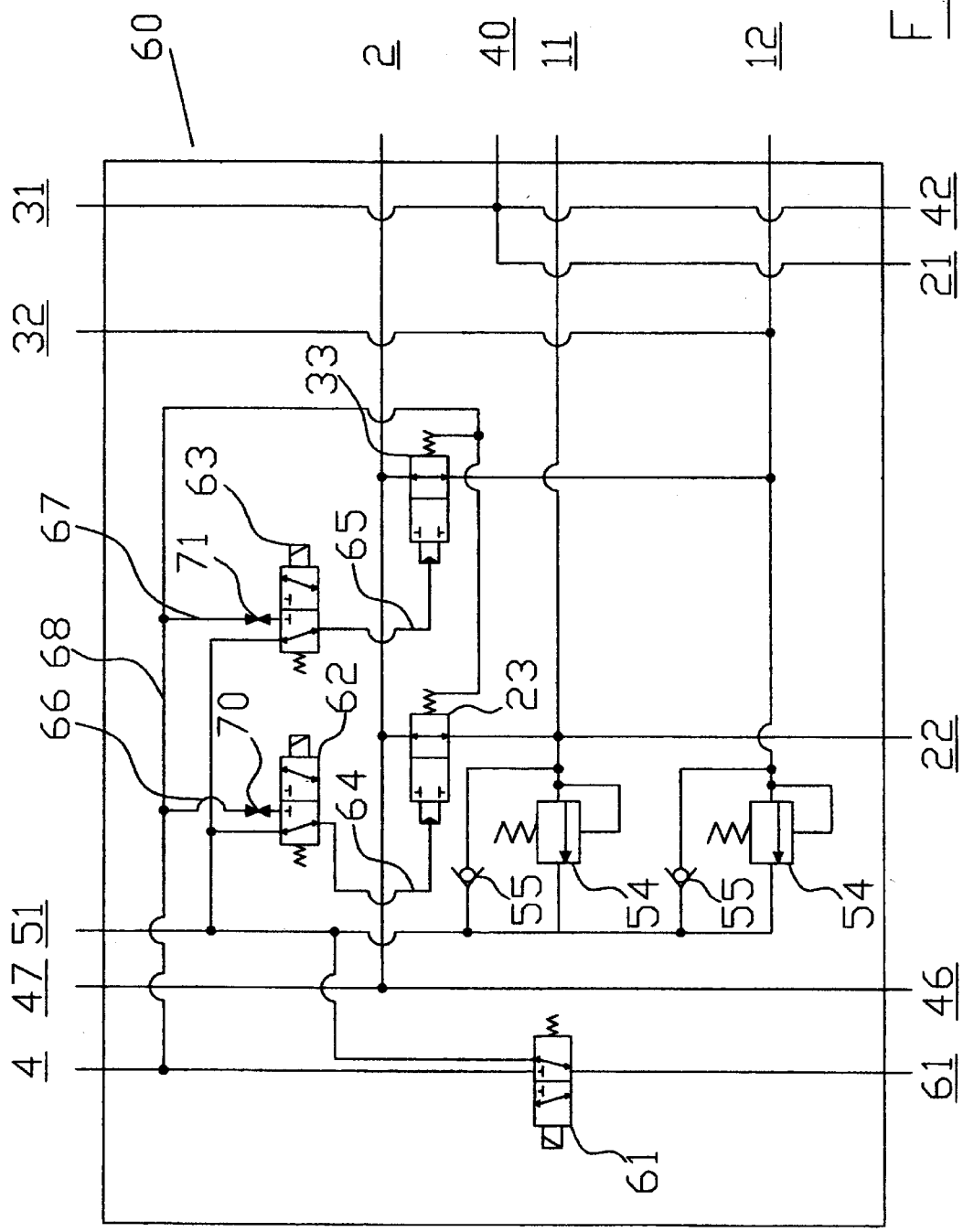
FIG. 2 is a diagrammatic view of a manifold block used in the invention.

Referring now to FIG. 2, there is illustrated a manifold block indicated generally by the reference numeral 60 of substantially conventional construction incorporating many of the valves used in the invention. The same reference numerals are used to identify the same valves within the block 60 as were hereinbefore described. The connection ports for hydraulic lines or to the oil sump 4 are identified by underlined reference numerals. The full lines all identify hydraulic fluid line connections many of which are not identified by reference numerals. There is included in the manifold block 60 a conventional brake valve 61 feeding a brake port identified by the underlined reference number 61. Each diverter valve 23 and 33 is a piston type valve kept normally shut by control valves 62 and 63 respectively. Each control valve 62 and 63 is a solenoid operated spool valve feeding oil in one position directly from the hydraulic line 51 to the diverter valves 23 and 33 through hydraulic feed lines 64 and 65 respectively. In the other position, the control valves 62 and 63 connect the hydraulic feed lines 64 and 65 through further hydraulic feed lines 66 and 67 respectively and 68 to the oil sump 4. Flow restrictors in the form of orifices 70 and 71 in the hydraulic feed lines 66 and 67 respectively are provided. In this embodiment, the diverter valves 23 and 33 are positive displacement piston valves of conventional construction. It is envisaged that in certain situations the one solenoid valve may be used.

In operation, the diverter valves 22 and 23 are normally closed with pressurised hydraulic fluid being applied to them through the control valves 62 and 63 through the hydraulic feed lines 64 and 65 respectively from the hydraulic line 51. When the solenoids of the control valves 62 and 63 are activated, the hydraulic connection is broken and the hydraulic fluid in the diverter valves 23 and 33 leaks through the orifices 70 and 71 so that the diverter valves 23 and 33 open after a time delay, usually of the order of 0.5 to 2.0 seconds, usually 1.0 seconds. Thus, there is a gentle transfer from series to parallel operation.

It will be appreciated that reversing the hydraulic pump causes the hydraulic drive system to operate in reverse in the same manner as in the forward direction.

While the drives have been shown as separate drives, they would each normally be formed from the one hydraulic motor having two individual cylinders. The motor would generally have two separate inputs and the one linked output.

Generally, each hydraulic motor comprises a plurality of cylinders having pistons: a pair of input ports and a separate supply line connecting each input port with a number of cylinders. In such an arrangement, there is also usually the one output port and a return line connecting all the cylinders to the output port. The cylinders are generally of the same capacity and thus the torque can be varied by deciding how many cylinders will be connected to each input port. It is possible to have any arrangement of torques and speed though generally speaking the pumps are often divided into two separate drives of the same capacity.

The terms "include", "includes", "included", "including" and the terms "comprise", "comprises", "comprised" and "comprising" are used interchangeably in this specification and are to be afforded the widest possible interpretation.

The invention is not limited to the embodiments hereinbefore described which may be varied in both construction and detail within the scope of the claims.

What is claimed is:

1. An hydraulic drive system for a three wheeled vehicle, each wheel having a separate wheel drive shaft assembly, each comprising a drive unit comprising at least two separate drives directly coupled to each other and together forming an in-line pair of drive shaft assemblies each comprising a transverse drive unit and a single drive shaft assembly comprising a single drive unit, the system comprising:

an hydraulic pump;

a sump for storage of an hydraulic oil supply;

input feed piping connecting the hydraulic pump, sump and the drives; and an hydraulic drive controller comprising:

hydraulic feed lines for feeding each of the drive units from the pump;

hydraulic feed lines for return of hydraulic fluid from each drive unit to the pump;

a secondary feed line connecting one of the drives of the single drive unit and one of the drives of one of the transverse drive units;

a further secondary feed line connecting the other drive of the single drive unit and one of the drives of the other transverse drive unit;

a bypass hydraulic line mounted across each of the transverse drive units;

a diverter valve mounted in each bypass hydraulic line for parallel and series operation, the diverter valve comprising a hydraulic fluid operated diverter valve activated by a control valve in a hydraulic feed line of the drive controller and connected via a flow reducing device to the hydraulic oil supply, the control valve being movable from a position delivering pressurized fluid to the diverter valve to a position closing off the supply of pressurized fluid and permitting flow of the hydraulic fluid out of the diverter valve through the flow reducing device to the sump; and a pressure release valve in each secondary feed line.

2. An hydraulic drive system of claim 1 in which the pressure release valve directly feeds back into the hydraulic oil supply.

3. An hydraulic drive system of claim 1 in which the pump feeds oil through a non-return valve to each secondary hydraulic feed line.

4. An hydraulic drive system of claim 3 in which the pressure release and non-return valves are incorporated in one assembly.

5. An hydraulic drive system of claim 1 in which there is a time delay between changing from series operation to parallel operation.

6. An hydraulic drive system of claim 5 in which the time delay is between 0.5 and 2.0 seconds.

7. An hydraulic drive system of claim 5 in which the time delay is approximately 1.0 seconds.

8. An hydraulic drive system of claim 1 in which the control valve is a solenoid operated spool valve.

9. An hydraulic drive system of claim 1 in which the control valve is a solenoid operated spool valve and the diverter valve is a piston valve.

10. An hydraulic drive system of claim 1 in which the valves are housed in a manifold block.

11. An hydraulic drive system for a three wheeled vehicle, each wheel having a separate wheel drive shaft assembly, each comprising at least two separate drives directly coupled to each other and together forming an in-line pair of drive shaft assemblies each comprising a transverse drive unit and a single drive shaft assembly comprising a single drive unit, the system comprising:

an hydraulic pump;

an oil supply;

input feed piping connecting the hydraulic pump, oil supply and the drives; and an hydraulic drive controller comprising:

hydraulic feed lines for feeding each of the drive units from the pump;

hydraulic feed lines for return of hydraulic fluid from each drive unit to the pump;

a secondary feed line connecting one of the drives of the single drive unit and one of the drives of one of the transverse drive units;

a further secondary feed line connecting the other drive of the single drive unit and one of the drives of the other drive unit;

a bypass hydraulic line mounted across each of the transverse drive units; and a diverter valve mounted in each bypass hydraulic line for parallel and series operation, the diverter valve comprising a hydraulic fluid operated diverter valve activated by a control valve in a hydraulic feed line of the drive controller and connected via a flow reducing device to the hydraulic oil supply, the control valve being movable from a position delivering pressurised fluid to the diverter valve to a position delivering pressurised fluid to the diverter valve to a position closing off the supply of pressurised fluid and permitting flow of the hydraulic fluid out of the diverter valve through the flow reducing device to the sump.

12. An hydraulic drive system of claim 11 in which the control valve is a solenoid operated spool valve.

13. An hydraulic drive system of claim 11 in which the control valve is a solenoid operated spool valve and the diverter valve is a piston valve.

14. An hydraulic drive system of claim 11 in which the valves are housed in a manifold block.

* * * * *